United States Patent
Cheng

(10) Patent No.: US 10,512,040 B2
(45) Date of Patent: Dec. 17, 2019

(54) METHOD AND APPARATUS FOR ON-DEMAND MOBILE DEVICE ACCESS

(71) Applicant: CHINA ACADEMY OF TELECOMMUNICATIONS TECHNOLOGY, Beijing (CN)

(72) Inventor: Fang-Chen Cheng, Randolph, NJ (US)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 3 days.

(21) Appl. No.: 15/672,501

(22) Filed: Aug. 9, 2017

(65) Prior Publication Data

US 2018/0049126 A1   Feb. 15, 2018

Related U.S. Application Data

(60) Provisional application No. 62/373,818, filed on Aug. 11, 2016.

(51) Int. Cl.
| | |
|---|---|
| *H04W 52/02* | (2009.01) |
| *G06F 1/3209* | (2019.01) |
| *G06F 1/3287* | (2019.01) |
| *H04W 76/28* | (2018.01) |
| *H04W 76/27* | (2018.01) |

(52) U.S. Cl.
CPC ...... *H04W 52/0225* (2013.01); *G06F 1/3209* (2013.01); *G06F 1/3287* (2013.01); *H04W 52/0245* (2013.01); *H04W 52/0274* (2013.01); *H04W 76/27* (2018.02); *H04W 76/28* (2018.02)

(58) Field of Classification Search
CPC ......... H04W 52/0225; H04W 52/0274; H04W 52/0245; H04W 76/27; H04W 76/28; G06F 1/3209; G06F 1/3287
See application file for complete search history.

(56) References Cited

U.S. PATENT DOCUMENTS

| | | | |
|---|---|---|---|
| 5,471,212 A | 11/1995 | Sharpe et al. | |
| 2004/0246100 A1 | 12/2004 | Kranz | |

(Continued)

FOREIGN PATENT DOCUMENTS

| | | |
|---|---|---|
| CN | 202795422 U | 3/2013 |
| CN | 103226726 A | 7/2013 |

(Continued)

OTHER PUBLICATIONS

Wikipedia: "dBm", https://en.wikipedia.org/wiki/DBm; retrieved Oct. 3, 2018. (Year: 2018).*

(Continued)

*Primary Examiner* — Joshua Kading
(74) *Attorney, Agent, or Firm* — Sheppard Mullin Richter & Hampton LLP

(57) ABSTRACT

Systems and methods are provided for on-demand access. An example network on-demand access method implementable by a device may comprise receiving a wakeup signal by an antenna of the device, deriving power from the received wakeup signal, determining, using the derived power, if the received wakeup signal corresponds to the device, and in response to the determination that the received wakeup signal corresponds to the device, setting the device to an active power mode.

19 Claims, 7 Drawing Sheets

(56) References Cited

U.S. PATENT DOCUMENTS

| | | | |
|---|---|---|---|
| 2010/0240319 A1* | 9/2010 | Matsuo | H04W 52/0225 455/68 |
| 2011/0156640 A1 | 6/2011 | Moshfeghi | |
| 2011/0317601 A1* | 12/2011 | Bekritsky | H04W 52/0229 370/311 |
| 2014/0211678 A1* | 7/2014 | Jafarian | H04W 52/0216 370/311 |
| 2015/0087255 A1 | 3/2015 | Wentzloff et al. | |
| 2016/0100294 A1* | 4/2016 | Ruelke | H04L 5/0016 455/509 |
| 2016/0128128 A1* | 5/2016 | Ang | H04W 52/0222 370/311 |
| 2017/0295545 A1* | 10/2017 | Zacchio | H04W 52/0229 |

FOREIGN PATENT DOCUMENTS

| | | |
|---|---|---|
| CN | 105556911 A | 5/2016 |
| CN | 105636181 A | 6/2016 |
| KR | 101084818 B1 | 6/2011 |

OTHER PUBLICATIONS

Ansari, Junaid et al., "Radio-Triggered Wake-Ups with Addressing Capabilities for Extremely Low Power Sensor Network Applications", 2008 IEEE 19th International Symposium on Personal, Indoor and Mobile Radio Communications, Sep. 15-18, 2008. (Year: 2008).*

Marinkovic, Stevan J. et al., "Power Efficient Networking Using a Novel Wake-up Radio", 2011 5th International Conference on Pervasive Computing Technologies for Healthcare (PervasiveHealth) and Workshops, May 23-26, 2011. (Year: 2011).*

Takiguchi, Takahiro et al., "A Novel Wireless Wake-up Mechanism for Energy-efficient Ubiquitous Networks", 2009 IEEE International Conference on Communications Workshops, Jun. 14-18, 2009. (Year: 2009).*

International Search Report and Written Opinion for Application No. PCT/IB2017/001117, dated Jan. 15, 2018, 11 pages.

Extended European Search Report dated Jul. 17, 2019, issued in related European Application No. 17838866.6 (8 pages).

* cited by examiner

METHOD AND APPARATUS FOR ON-DEMAND MOBILE DEVICE ACCESS

CROSS-REFERENCE TO RELATED APPLICATIONS

This application claims the benefit of U.S. Provisional Application Ser. No. 62/373,818, filed Aug. 11, 2016, and entitled "METHOD AND APPARATUS FOR ON-DEMAND MOBILE DEVICE ACCESS." The entirety of the aforementioned application is incorporated herein by reference.

FIELD OF THE INVENTION

This disclosure generally relates to approaches and techniques for power conservation in communications.

BACKGROUND

In communications, power conservation is a significant factor in system and product design. For example, various electronic devices, such as mobile phones, pads, and smart devices, may be required to consume as less power as possible.

SUMMARY

Various embodiments of the present disclosure can include systems, methods, and non-transitory computer readable media configured to access communication networks on-demand. In some embodiments, a network on-demand access method may be implementable by a device and may comprise receiving a wakeup signal by an antenna of the device, deriving power from the received wakeup signal, determining if the received wakeup signal corresponds to the device, wherein the determining uses at least the power derived from the received wakeup signal, and in response to a determination that the received wakeup signal corresponds to the device, setting the device to an active power mode.

In some embodiments, the network on-demand access method may further comprise, in response to determining that no portion of the received signal corresponds to the device, leaving the device in the sleeping power mode.

In some embodiments, the determining if the received wakeup signal corresponds to the device may use the power derived from the received wakeup signal without power supply from a power source.

In some embodiments, a network on-demand access device may comprise an antenna configured to receive a signal, a rectifier circuit configured to drive power from the received signal, a logic circuit configured to determine if the received signal corresponds to the device, and a control circuit configured to, in response to a determination that the received signal corresponds to the device, set the device to an active mode.

In some embodiments, a network on-demand access method may comprise receiving a signal while the device is in a sleeping power mode, rectifying the received signal to derive DC power, determining if the received signal corresponds to the device using the derived DC power, and in response to a determination that the received signal corresponds to the device, setting the device to an active power mode using the derived DC power.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
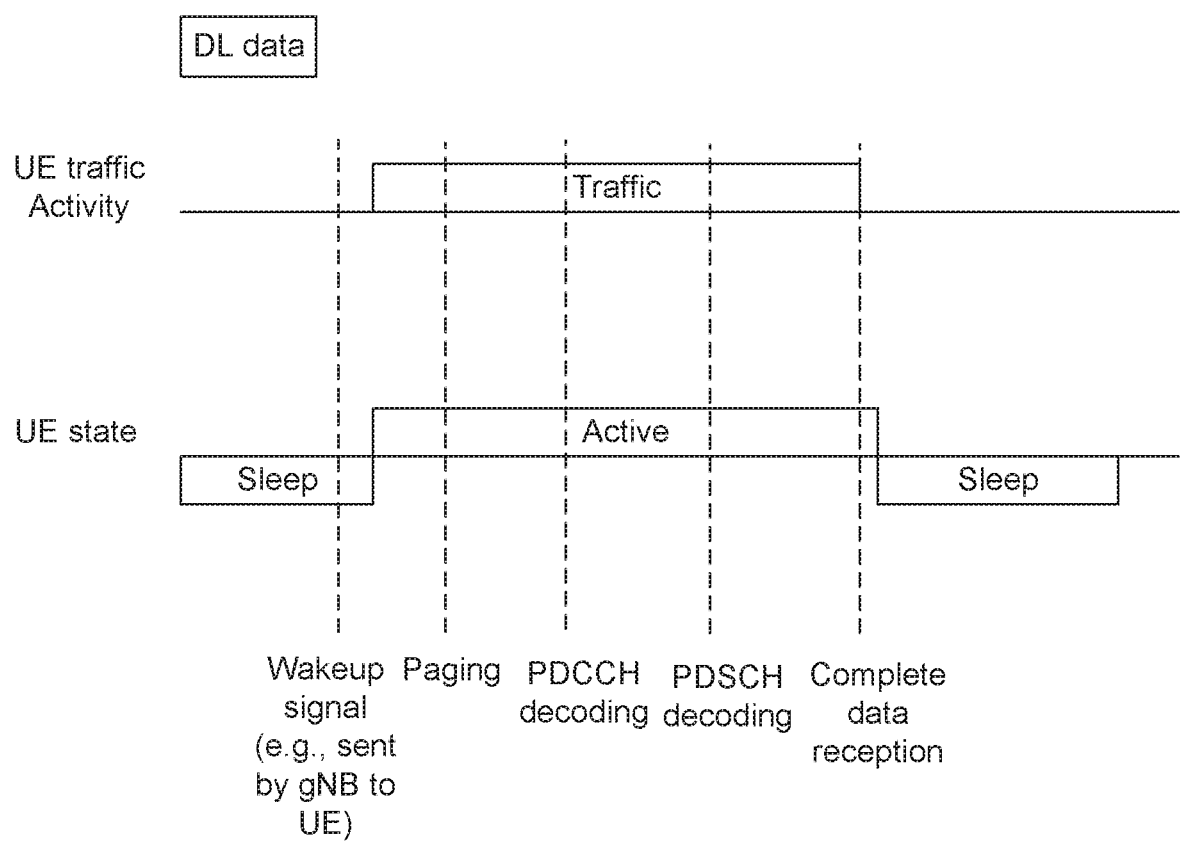
FIG. 1 is a time-series diagram illustrating a device for network on-demand access, consistent with exemplary embodiments of the present disclosure.

In communications and various other applications, power conservation is a major concern for the design and development of user equipment (UE) devices. UE devices (e.g., mobile phones, pads, pagers, computers, smart devices, sensors, etc.) may be used to receive and transmit data, information, and signals via various channels (e.g., Wi-Fi, 4G, 5G, LTE, Bluetooth, Zigbee, etc.), and high speed data transmission or reception requires higher power consumption. Power saving is achieved by turning off power in all or some parts of the UE device in a controlled manner when it is not actively transmitting or receiving data, that is, entering a sleeping power mode (can also be called "sleeping mode"). The term "sleeping power mode" can include other similar terms referring to the same UE state.

In current technologies, idle mode and discontinuous reception (DRX within the connected mode) are provided for power saving. A UE can enter idle mode where the UE is no longer actively connected to the eNB (evolved node B in 4G, a hardware that connects the UE to the network. In 5G, a similar hardware is known as gNB). For example, when a mobile phone is just powered on and no data exchange operation is performed, the mobile phone is not connected to the network and is in the idle mode, and will enter the connected mode if a user starts to use application to exchange data with the network (e.g., LTE). Nevertheless, in the idle mode, the network is still able to keep track of the UE through paging. During every paging cycle, the eNB may send out a paging message at a known period of time called as paging occasion. The UE can wake up from a sleeping power mode during the paging occasion and listen to the paging message to check and see if it is being paged. Such paging occasion-no paging (active-sleep) cycle repeats, which may be similar to the DRX cycles described below.

In the connected mode, DRX can be enabled to save power by allowing the UE to power down for pre-determined intervals, as directed by the eNB. For example, when a mobile phone is used to browse internet, it is connected to the network and data is exchanged, but it enters into DRX cycles when the mobile phone is not used and no further data exchange is performed. A user may operate a UE (e.g., a mobile phone) to transmit or receive data, and such communication between the UE and one or more communication nodes may be represented by "traffic," when the UE is in the connected mode. After a while, the user may leave the UE aside, and an inactivity timer kicks in. If the inactivity timer condition is fulfilled, the DRX cycles may start. In DRX cycles, the UE device is still connected to the network and may wake-up periodically and listen to control channels (e.g., to listen for incoming communications or data from PDCCH (physical downlink control channel)). That is, the UE device may actively awaken and still communicate with a communication node, such as base station (e.g., eNB, a telecommunication tower, an antenna, etc.), at a certain time interval. During DRX ON, the UE monitors the control channel for data and control activity, and the eNB is able to exchange data with the UE. During DRX OFF, the UE can go into a sleeping power mode, and the eNB cannot send any data to the UE. DRX is terminated as soon as the UE either sends UL (uplink) data or receives DL (downlink) data. The UE connects to the network in the connected mode (even when sleeping) and does not connect to the network in the idle mode. Thus, for UE in the connected mode, the sleep mode conserves power while still exchanging data.

In order to prevent any significant delay of the incoming message or call, the time interval for the sleeping mode is typically set to tens or hundreds of milliseconds, which is unlikely to be noticed by the user. However, this frequent time interval of wake-up may cause significant power consumption to the terminal device over time in both the idle and connected modes. Therefore, it is desirable to provide energy-efficient wake-up and paging methods and systems to improve the usability of UE devices.

The disclosed system may support efficient network access, mitigating or overcoming one or more of the problems in the prior art, including further minimizing power consumption (e.g., in the connected and idle modes). Such methods and systems may also be referred to as network on-demand access in this disclosure. The disclosed systems and methods can achieve further power saving on UEs through passive triggering. That is, the UEs can remain in the sleeping mode unless triggered by wakeup signals. The wakeup signals can be generated from the UE (e.g., UL data arrival from a higher layer, so that UE wakes up and requests for UL transmission) and/or received by the UE (e.g., the network wakes up the UE on-demand to transmit DL data or perform system information change). As shown in FIG. 1, in some embodiments, a communication node (e.g., a gNB) may need to transmit data (e.g., DL data) to a UE, which may be in a sleeping power mode. The communication node may transmit a signal (e.g., a wakeup signal) to the UE. The UE device may awaken from the sleeping power mode and be in a non-sleeping power mode (e.g., the active mode) and transmit or receive data traffic. For example, the UE may page the communication node, perform PDCCH decoding, and perform PDSCH (physical downlink shared channel) decoding. The UE device may go back to the sleeping mode after completing the data reception (e.g., when an inactivity timer triggers). In some embodiments, a network on-demand access method may be implementable by a device (e.g., the UE device) and may comprise receiving a signal (e.g., the wake-up signal from the communication node) and deriving power from the received wakeup signal. The UE device uses the derived power to determine if the received wakeup signal corresponds to the UE device. In response to a determination that the received wakeup signal corresponds to the device, setting the device to an active power mode.

Thus, the disclosed systems and methods obviate the periodic wake-up in the DRX cycles (in the case of connected mode) and the paging occasions (in the case of idle mode), leaving the UE device in an extended sleeping mode and consuming minimal power when not used for interaction with networks. Active communications are triggered upon wake-up signals.

In some embodiments, the disclosed systems and methods may support a high density of UE devices within an area with high connectivity. The disclosed systems and methods may be implemented as a part of a New Radio (NR) system or other wireless communication system. The NR system may deploy frequency ranges up to 100 GHz with the objective of a single technical framework addressing all usage scenarios including, for example, enhanced mobile broadband (eMBB), massive machine type communications, and ultra-reliable and low latency communications (URLLC). The NR system can ensure smooth introduction or integration of future services and features with no impact on the access of earlier services and UE. Further, multiplexing different numerologies within the same NR carrier bandwidth (from the network perspective) is supported, and frequency division multiplexing (FDM) and/or time division multiplexing (TDM) can be used.

As such, the disclosed systems and methods can help achieve massive machine type communication and idle mode UE network access. The massive machine type communication (mMTC) in the NR system targets to have battery power to last for 10-15 or more years. The machine type communication can also be implemented as the automotive recording devices, such as parking meters, utility meters, and connected cars, as well as internet of things (IoT), sensor networks, automatic home control systems, location tracking devices, wearable devices, biomedical sensors, communication devices (e.g., mobile phones, pads), computers, and electronic identification system. In particular, the disclosed systems and methods can ensure long-lasting batteries and efficiently operations of mMTC devices or UE devices to have efficient network accesses, overcoming the deficiencies in existing technologies. The efficient network access also applies to the paging strategy for sleeping mode UE devices in the eMBB and URLLC deployment scenario. The mMTC device and UE devices disclosed herein may include a mobile terminal, such as a mobile phone, a laptop, a tablet, a pad, a data terminal, and the like.

Figure 2:
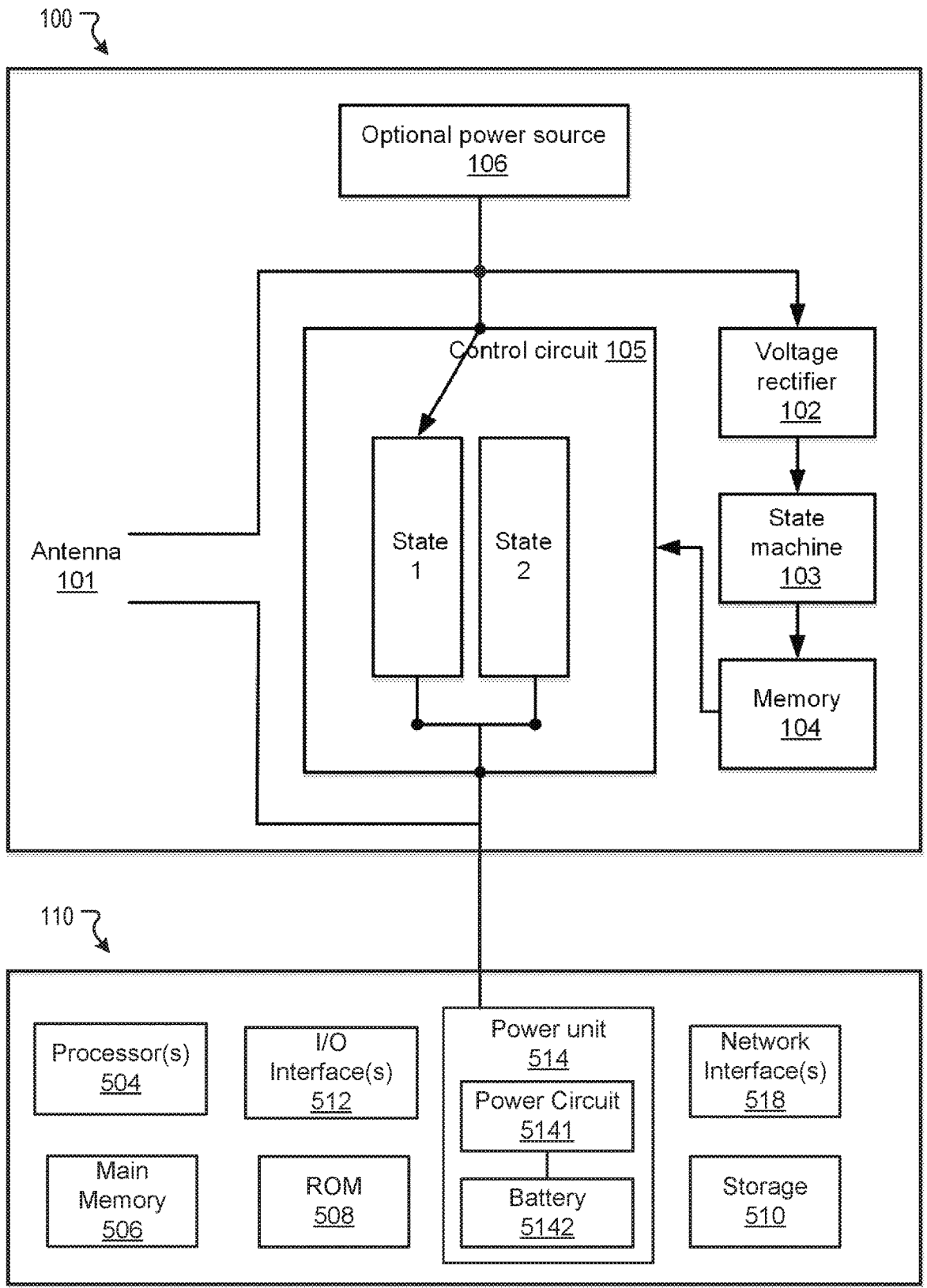
FIG. 2 is a circuit diagram illustrating a device for network on-demand access, consistent with exemplary embodiments of the present disclosure.

FIG. 2 is a circuit diagram illustrating a receiver system 100 for network on-demand access, consistent with exemplary embodiments of the present disclosure. Receiver system 100 may comprise a number of components, some of which may be optional. In some embodiments, the receiver system 100 may include many more components than those shown in FIG. 2. However, it is not necessary that all of these components be shown in order to disclose an illustrative embodiment. The receiver system 100 may be coupled to or attached to a system 110 (e.g., a mobile phone system or another UE system), or the receiver system 100 may be integrated with the system 110 (e.g., receiver system 100 and the system 110 being implemented on a terminal device). That is, the receiver system 100 may be integrated with an existing terminal device circuit, for example, by integrating the extra circuits with the existing mobile phone circuit. In some embodiments, the receiver system 100 may be similar to the receiver implementation of a radio frequency identification (RFID) of a terminal device with backscattering technologies. The receiver system 100 may also be referred to a receiver implementation of backscattering technologies. Although the receiver system 100 and the system 110 are shown as separated systems In FIG. 2, the receiver system 100 may also be divided into multiple sub-components and integrated with one or more other components to form a UE/terminal device. For example, the receiver system 100 and the system 110 are integrated and discussed below with reference to FIG. 5. Therefore, the components and sub-components and functions of the system 110, such as the processor 504, the main memory 506, the I/O interface 512, the ROM 508, the power unit 514, the power circuit 5141, the battery 5142, the network interface 518, and the storage 510 are referenced below with respect to FIG. 5.

In some embodiments, the receiver system 100 may comprise an antenna 101 connected to a voltage rectifier 102, a state machine 103, a memory 104, and a control circuit 105 coupled to one another. There may be various ways of coupling the components of the receiver system 100, e.g., as shown in FIG. 2, the antenna 101 couples to the control circuit 105 and the voltage rectifier 102, the voltage rectifier 102 couples to the state machine 103, the state machine 103 couples to the memory 104, and the memory 104 couples to the control circuit 105. Alternatively, the voltage rectifier may couple to the memory 104, the memory 104 may couple to the state machine 103, and the state machine 103 may couple to the control circuit 105. Alternatively, the components of the receiver system 100 may couple to a communication bus (e.g., a wired or wireless communication bus). The receiver system 100 may further comprise an optional power source 106 (e.g., a battery). In an exemplary embodiment, the receiver system 100 may be implemented as a passive device. That is, the receiver system 100 does not include the power source 106 and does not require to receive power from its own power supply. The receiver system 100 is configured to derive power only from electromagnetic waves of the received signal. In another exemplary embodiment, the receiver system 100 include the power source 106 and derives power only from electromagnetic waves of the received signal and the power source 106. The power derived from the power source 106 is only used for improving the reception of the signal. In both embodiments, the receiver system 100 does not receive power supply from the system 110.

In some embodiments, the antenna 101 may be configured to receive signals at a certain frequency range, such as radio frequency (RF) signals, from a communication node, e.g., a wireless transmitter, a base station. The antenna 101 may be a highly reactive RF front end (e.g., one or more inductive or capacitive coupling coils) configured to be excited by the electromagnetic wave of the received signal. The received signal can also power the various components of the receiver system 100. A person skilled in the art would appreciate various methods for the receiver system 100 to wirelessly derive power from the received electromagnetic waves, such as inductively coupling, magnetic coupling, highly coupled magnetic resonance, etc. The voltage rectifier 102 may comprise a rectifier circuit configured to convert the RF signal received by the antenna 101 to a DC power to power the other components of the receiver system 100. For example, when the RF field transmitted by a communication node and passes through the antenna 101's coils, an AC voltage can be generated across the coil, and the AC voltage can be rectified to supply power to the receiver system 100. Thus, the antenna 101, the voltage rectifier 102, the state machine 103, the memory 104, and/or the control circuit 105 may not be powered by an active power source (e.g., battery, charger when connected with a power outlet, etc.). Unlike backscattering in RFID, where signals are received from a radio by a tag and reflected back by the tag to the radio to identify the tag, no reflection needs to be performed here and at least power loss for the reflection transmission can be prevented.

The state machine 103 may comprise a processor configured to control one or more components of receiver system 100, such as the switch operation of the control circuit 105. The memory 104 may be a non-transitory computer-readable storage media storing instructions that, when executed by the state machine 103, cause one or more components of the receiver system 100 to perform methods disclosed herein. The memory 104 may also be configured to store various data or information, such as identifications described below. The control circuit 105 may be configured to switch between two or more states, such as state 1 and state 2 shown in FIG. 2. The control circuit 105 may comprise one or more transistors to effectuate the state switching. The control circuit 105 may couple to various components of a terminal/UE device, to promulgate the state switching. For example, the control circuit 105 may couple to a power unit (e.g., power unit 514) comprising a power circuit (e.g., power circuit 5141) and one or more batteries (e.g., battery 5142) of a UE device, and switching the control circuit 105 can effectuate power control of the UE device via the power unit. That is, the switching the control circuit 105 can place the UE device in a non-sleeping (e.g., active) power mode (e.g., awakening the UE device from a sleeping mode to an active power mode) or in an inactive power mode (e.g., leaving the UE device in a current sleeping mode). In the non-sleeping power mode, the UE device may assume regular functions, consume regular power, and access communication networks in a normal operation manner to transmit or receive data. In the sleeping power mode, the UE device may consume minimal (e.g., zero) power and may not access communication networks. Here, regular and minimal powers are relative terms corresponding to various power states of the UE device.

In one example, the state machine 103 may compare the DC power from the voltage rectifier 102 with a threshold. If the DC power is larger than a threshold, the state machine 103 may switch the control circuit 105 to state 1; and if otherwise, the state machine 103 may switch the control circuit 105 to state 2. For a UE device in a sleeping mode, in state 1, the control circuit 105 may awaken the UE device from the sleeping power mode to a non-sleeping (e.g., active) power mode, and in state 2, the control circuit 105 may leave the UE device in the sleeping power mode. Optionally and alternatively, the control circuit 105 may module the backscattering signals between the state 1 and the state 2 to the communication node.

In another example, the state machine 103 may comprise a logic circuit, e.g., a control logic module, with a controller function. The state machine 103 may be configured to demodulate the received signals. The control logic module may comprise a modulation circuitry configured to demodulate the waveform received by the antenna 101 and decode the contents of the received signals. The contents of the received signals may be simple and straight-forward to avoid complicated control logic function with excessive power consumption. For example, the signal received by antenna 101 and/or the DC power converted by the voltage rectifier 102 may be convertible to a 8-digit, 16-digit, or another format of UE ID or temporary ID. The state machine 103 may demodulate and decode the received signal to obtain the UE or temporary ID. The state machine 103 may then compare the UE ID or temporary ID with a device ID, which is stored in the memory 104 and corresponds to the terminal device associated with the receiver system 100, to determine whether to wake up the terminal device. If the comparison result is a match, the state machine 103 may control the control circuit 105 to wake up/activate the associated UE device, causing the UE device to be switched to a non-sleeping (e.g., active) power mode. If the comparison result is a mismatch, the state machine 103 may control the control circuit 105 not to wake up/activate the associated UE device, causing the UE device to remain in the sleeping power mode.

As such, the receiver system 100 can wake-up the UE device only when needed (e.g., when the communication node transmits signals to the UE device), preventing unnecessary wake-up and power consumption. Further, the receiver system 100 may derive power solely from the incoming electromagnetic waves, and activate a connected UE device without using any power from the UE device, achieving energy conservation in the UE device. In some other embodiments, the receiver system 100 may also comprise a power source and become always self-powered, referred to as an active device. Alternatively, the receiver system 100 may comprise a power source and become self-powered when signals are received. Though the receiver system 100 can be passively, actively low-powered, the discussions herein focus on being passively powered, that is, deriving power only from the electromagnetic wave signals or low power.

In various embodiments of telecommunication, the transmitted signal from the communication node may have a narrow frequency band (referred to as a narrow band beacon). The narrow band beacon provides high energy concentration for extended coverage, and can be detected by UEs in the idle or sleeping mode. Such implementation works for the broadcast type of on-demand access, but cannot wake up specific UEs among all UEs in the broadcast range. With improvements to receiver system 100 as disclosed herein (e.g., with reference to FIG. 3 below), these embodiments can be used in a UE-specific on-demand access system.

Figure 3:
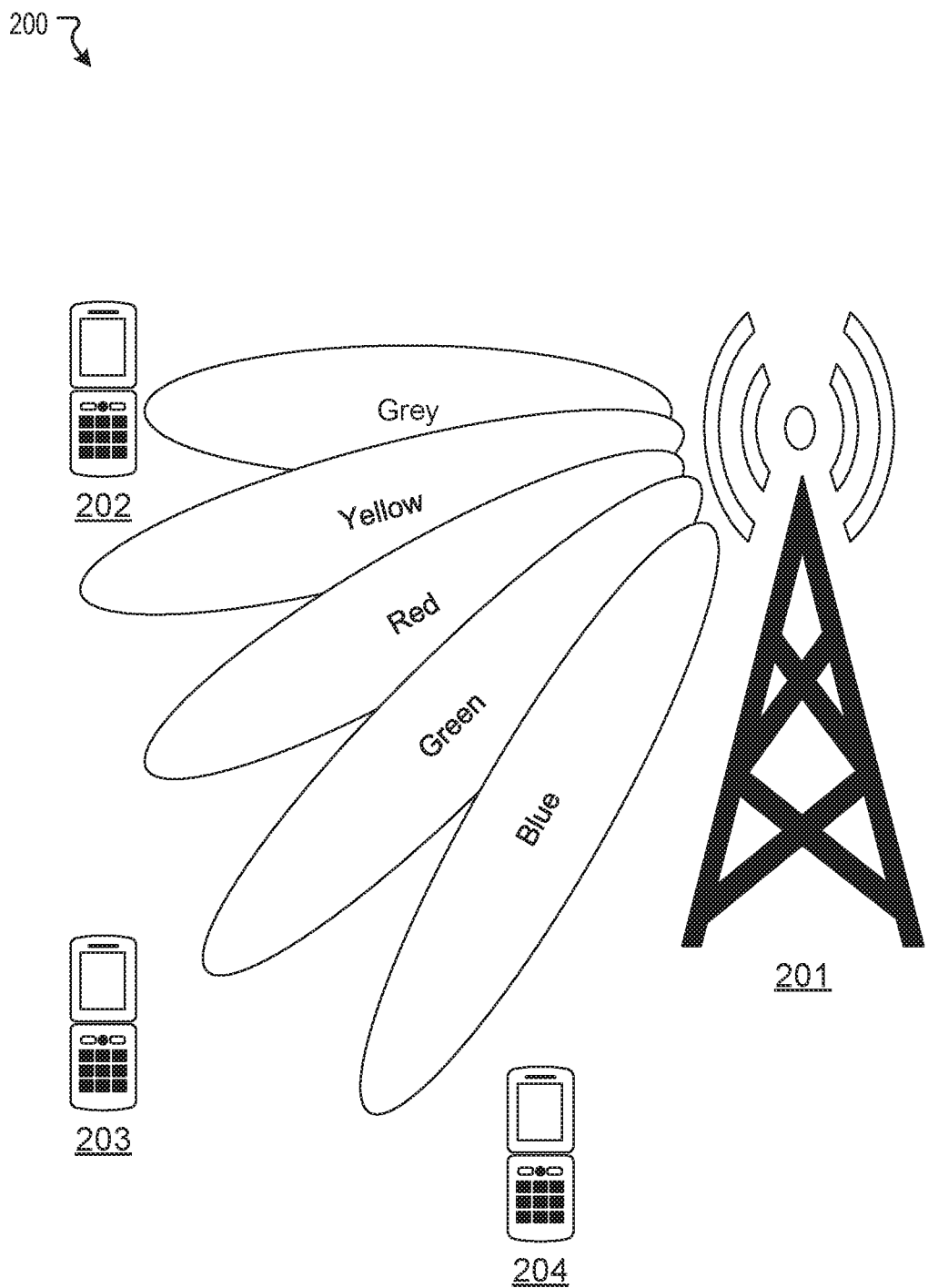
FIG. 3 is a graphical representation illustrating a system for network on-demand access, consistent with exemplary embodiments of the present disclosure.

FIG. 3 is a graphical representation illustrating a system 200 for on-demand access, consistent with exemplary embodiments of the present disclosure. System 200 may comprise a number of components, some of which may be optional. In some embodiments, the system 200 may include many more components than those shown in FIG. 3. However, it is not necessary that all of these components be shown in order to disclose an illustrative embodiment. The system 200 may comprise a device 201 wirelessly communicating with devices 202-204. The device 201 may include a communication node, such as a wireless data transmitter. The devices 202-204 may include one or more UE devices, such as mobile phones. The device 201 may communicate with the devices 202-204 via various device-dependent frequencies or frequency combinations. In FIG. 3, the device-dependent frequencies or frequency combinations can be represented by different colors. The devices 202-204 may each comprise the system 100 described above, and the system 200 may be implemented as the NR system described above.

The system 200 can support UE-specific on-demand access. In some embodiments, the control logic of backscattering with multiple beacons is to associate each UE device with a device-specific beacon combination comprised in the wakeup signal received by the UE device discussed above with reference to FIG. 2 and shown as various color bands in FIG. 3. In one example, the communication node transmits multiple beacons. Each beacon is in a different frequency sub-band. Multiple beacons could be transmitted from the communication node in the same time interval or different time intervals. In some embodiments, a UE device is configured by the communication node 201 with a selected combination of the beacons as the triggering function. That is, the UE device may be associated with a unique combination based on two or more of the frequencies or frequency bands. For example, the communication node 201 assigns a device-specific frequency combination to each UE device as the unique ID. For another example, each UE device or state machine creates a unique ID according to signals received from the communication node. With the unique ID, the UE devices may distinguish device-specific signals from the broadcast signals and ignore the rest. Correspondingly, the UE can tune its energy detector, e.g., the state machine 103, to the combination of configured beacons, such that the state machine 103 wakes up the idle UE if and only if the receiver system 100 detects the device-specific combination of beacons.

The benefits of using the beacon/frequency combination may include an extended coverage area and on-demand triggering of individual devices. In one example, where 10 beacons or communication frequencies are transmitted by the communication node, if the control logic is designed to receive one distinct beacon or frequency, the system would support up to 10 sleeping mode devices. If the control logic can receive a combination of 2 distinct beacons out of 10 beacons, the system can support up to 45 sleeping mode UE devices, since there are 45 distinct combinations of 2 out of 10 beacons. Similarly, for the combination of 3 distinct beacons, the system can support 120 sleeping mode UE devices. As disclosed by the system 200, the control logic of the UE devices can each receive a device-specific beacon/frequency combination. The energy detection with multi-beacon backscattering of system 200 can support UE-specific on-demand access by detecting signals corresponding to the exact device-specific combination of beacons. Thus, the system 200 can support the on-demand access for a large number of UE devices provided a communication bandwidth.

Figure 4A:
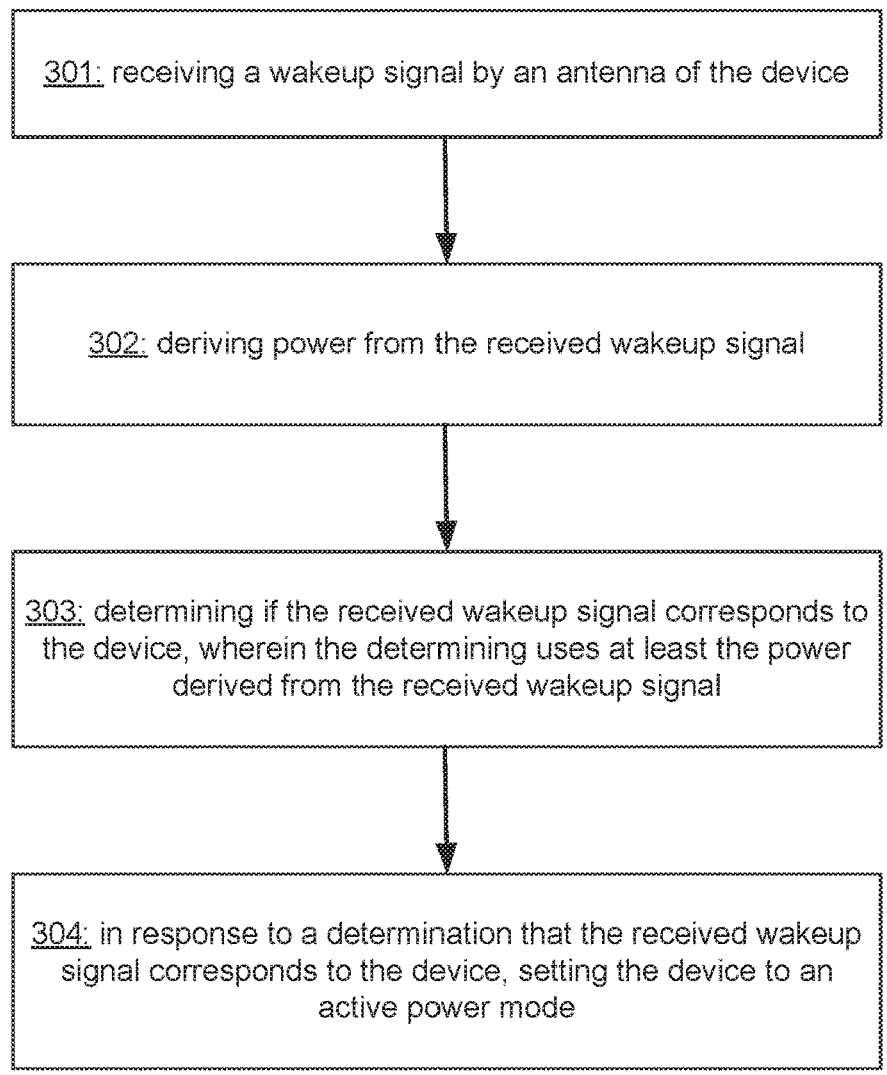
FIG. 4A is a flow diagram illustrating a method for network on-demand access, consistent with exemplary embodiments of the present disclosure.

FIG. 4A is a flow diagram illustrating a network on-demand access method 300 for, consistent with exemplary embodiments of the present disclosure. The method 300 may include the following steps, some of which may be optional. The order of the steps may be rearrange in another order. The method 300 may be implemented by a device (e.g., the system 100, 200, or 500, or the systems 100 and 110). The device may comprise mobile phone.

At step 301, one or more components of the system 100, 200, or 500 (e.g., the antenna 101) may receive a signal (e.g., a wakeup signal described above with reference to FIG. 1 to FIG. 3). The system may receive the signal while in a sleeping power mode. In some embodiments, receiving the signal may comprise receiving the signal from one or more communication nodes. The received signal may comprise two or more frequencies or frequency bands, and the device is associated with a unique combination based on two or more of the frequencies or frequency bands.

At step 302, one or more components of the system 100, 200, or 500 (e.g., the voltage rectifier 102) may derive power from the received wakeup signal. For example, the antenna 101 may transmit the received wakeup signal to the voltage rectifier 102, which converts the received signal to a DC power to provide power to the state machine 103 and the control circuit.

At step 303, one or more components of the system 100, 200, or 500 (e.g., the memory 104 and/or the state machine 103 (or alternatively, a processor)) may determine if the received wakeup signal corresponds to the device. As discussed above with reference to FIG. 3, a communication node may broadcast signals of multiple frequencies, some of which may correspond to one device and some of which may correspond to another device. The state machine 103 uses at least the power derived from the received wakeup signal and converted by the voltage rectifier 102 to make the determination. In some embodiments, the state machine 103 may use only the power derived from the received wakeup signal and converted by the voltage rectifier 102 to make the determination. In some embodiments, the state machine 103 may also use power from other power sources.

At step 304, one or more components of the system 100, 200, or 500 (e.g., (e.g., the control circuit 105 under the control of the state machine 103 or a processor) may, in response to determining that the received signal corresponds to the device, set the device to an active power mode. In some embodiments, in response to determining that the received signal corresponds to the device, transmitting a signal to set the device to a non-sleeping power mode may comprise in response to determining that the received signal corresponds to the device, awakening the device from a sleeping power mode to the non-sleeping power mode. The network on-demand access method may further comprise, in response to determining that the received signal does not correspond to the device, leaving the device in the sleeping power mode.

In some embodiments, the system 100 may be configured to derive power only from electromagnetic waves of the received signal, and the device may not reflect back any signal based on the received signal. In other words, the system 100 performs the above-described steps 301-304 using only the power derived from the received wakeup signal, without power supply from a power source. In some other embodiments, the system 100 may perform one or more of the steps 301-304, for example, steps 301-303, using only the power derived from the received wakeup signal, without power supply from a power source.

In some other embodiments, the system 100 may be configured to derive power only from electromagnetic waves of the received signal and a power source, e.g., the optional power source 106, the power derived from the power source may be only used for the reception of the signal, and the device may not reflect back any signal based on the received signal. The power source, e.g., the optional power source 106, may be a low power supply source, which is configured to provide a power supply of less than 10 dBm to the state machine 103 for determining if the received wakeup signal corresponds to the device. In another embodiment, the power source is configured to provide a power supply of less than 1 dBm to the state machine 103 for determining if the received wakeup signal corresponds to the device.

According to one aspect of the disclosure, one or more, or all of the above-described steps 301-304 are performed while the device is in the sleeping power mode.

In some embodiments, determining if the received signal corresponds to the device may comprise decoding the received signal to obtain one or more frequency combinations, each combination corresponding to an identification and comparing the obtained identifications with one or more identifications stored in a memory of the device and corresponding to the device. In response to determining that the received signal corresponds to the device, transmitting a signal to set the device to a non-sleeping power mode may comprise, in response to determining the obtained identifications comprise one or more of the stored identifications, transmitting the signal to set the device to the non-sleeping power mode.

Figure 4B:
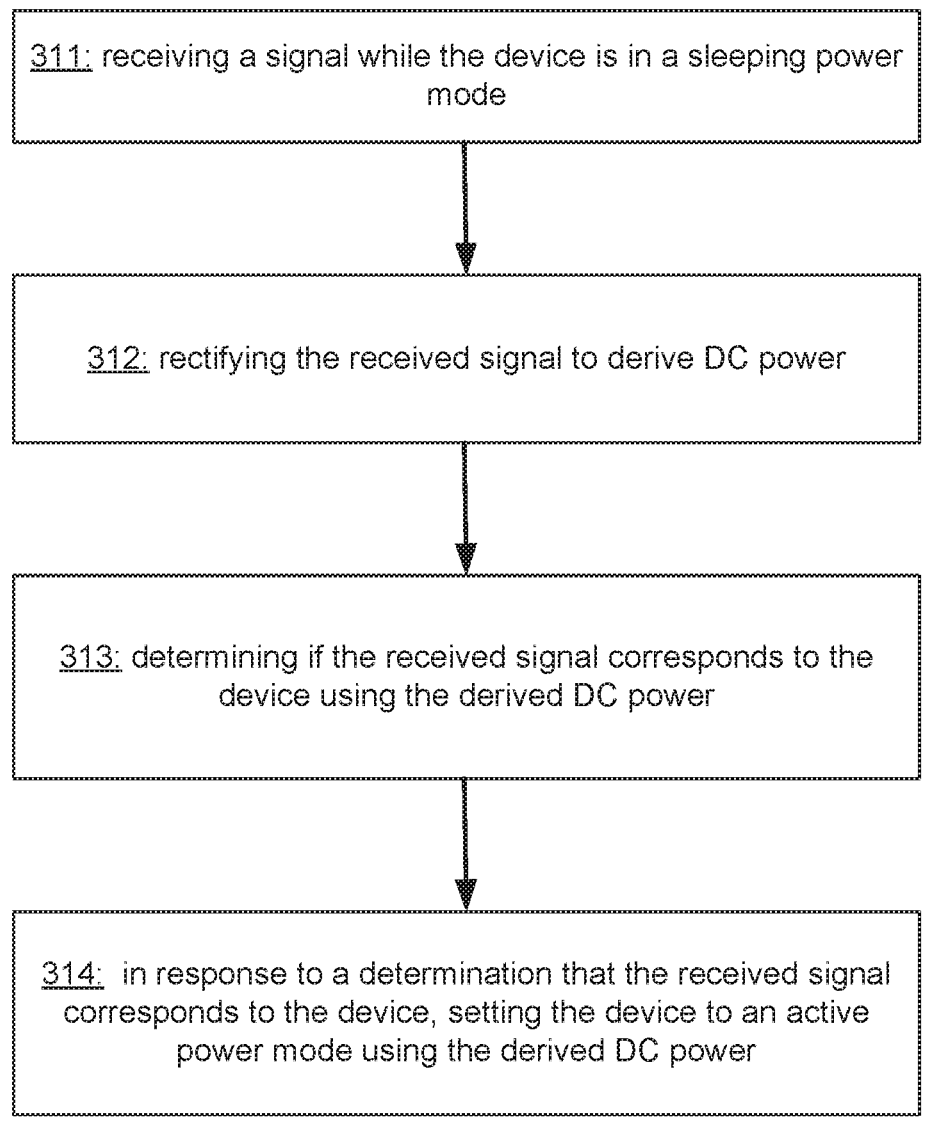
FIG. 4B is a flow diagram illustrating another method for network on-demand access, consistent with exemplary embodiments of the present disclosure.

FIG. 4B is a flow diagram illustrating a network on-demand access method 350 for, consistent with exemplary embodiments of the present disclosure. The method 350 may include the following steps, some of which may be optional. The order of the steps may be rearrange in another order. The method 350 may be implemented by a device (e.g., the system 100, 200, or 500, or the systems 100 and 110). The device may comprise mobile phone.

At step 311, one or more components of the system 100, 200, or 500 may receive a signal while the device is in a sleeping power mode.

At step 312, one or more components of the system 100, 200, or 500 may rectify the received signal to derive DC power.

At step 313, one or more components of the system 100, 200, or 500 may determine if the received signal corresponds to the device using the derived DC power.

At step 314, one or more components of the system 100, 200, or 500 may, in response to a determination that the received signal corresponds to the device, set the device to an active power mode using the derived DC power.

Figure 4C:
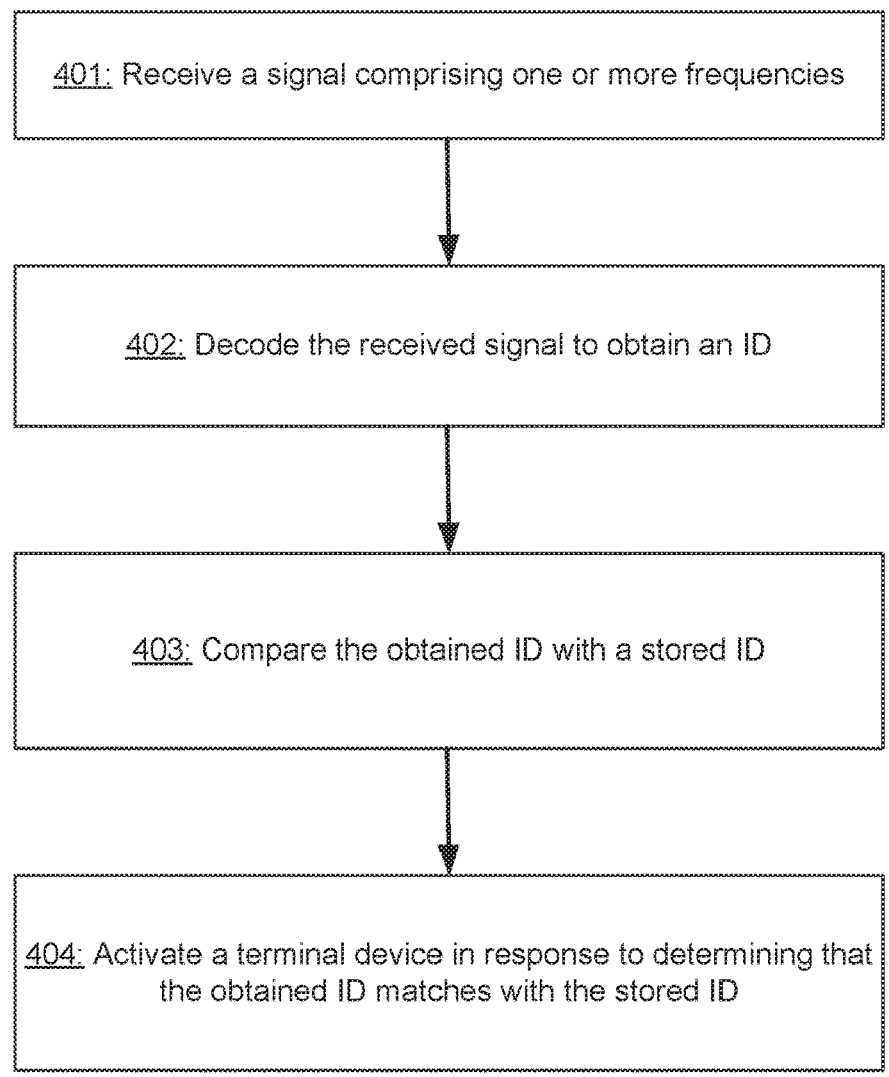
FIG. 4C is a flow diagram illustrating another method for network on-demand access, consistent with exemplary embodiments of the present disclosure.

FIG. 4C is a flow diagram illustrating a network on-demand access method 400, consistent with exemplary embodiments of the present disclosure. The method 400 may include the following steps, some of which may be optional. The order of the steps may be rearrange in another order. The method 400 may be implemented by a device (e.g., the system 100, 200, or 500, or the systems 100 and 110). The device may comprise mobile phone.

At step 401, one or more components of the system 100, 200, or 500 may receive a signal comprising one or more frequencies. For example, the antenna 101 may receive a beacon or frequency combination signal, comprising two or more frequency sub-bands.

At step 402, one or more components of the system 100, 200, or 500 may decode the received signal to obtain an ID. For example, the state machine 103 may decode the received signal to obtain an ID.

At step 403, one or more components of the system 100, 200, or 500 may compare the obtained ID with a stored ID. For example, the state machine 103 may compare the obtained ID with an ID associated with a terminal device and stored in the memory 104. The stored ID may be configured by a communication node and/or the terminal device prior to the step 303. For example, the stored ID may correspond to a frequency combination signal.

At step 404, one or more components of the system 100, 200, or 500 may activate a terminal device in response to determining that the obtained ID matches with the stored ID. For example, throughout method 300, the terminal device may be in a sleeping mode, and if the state machine determines that the obtained ID matched with the stored ID, the state machine 103 may activate or wake up the terminal device. Otherwise, the terminal device may remain in the sleeping mode.

Systems, methods, and devices for on-demand network access for sleeping mode UE devices are disclosed. The system can support a high density of UE devices within an area with a high connectivity with frequency combination signals. The on-demand access would allow UE devices to stay in the sleeping mode and wake up only when necessary. The sleeping mode can be a sleeping mode in a DRX configuration including a long sleeping mode in a long DRX configuration, or a sleeping mode in a UE active state (can also be called "micro-sleeping mode"). The backscattering can convert electromagnetic waves of the received signals to the DC power to trigger the device wakeup without any power supply from the device itself.

Figure 5:
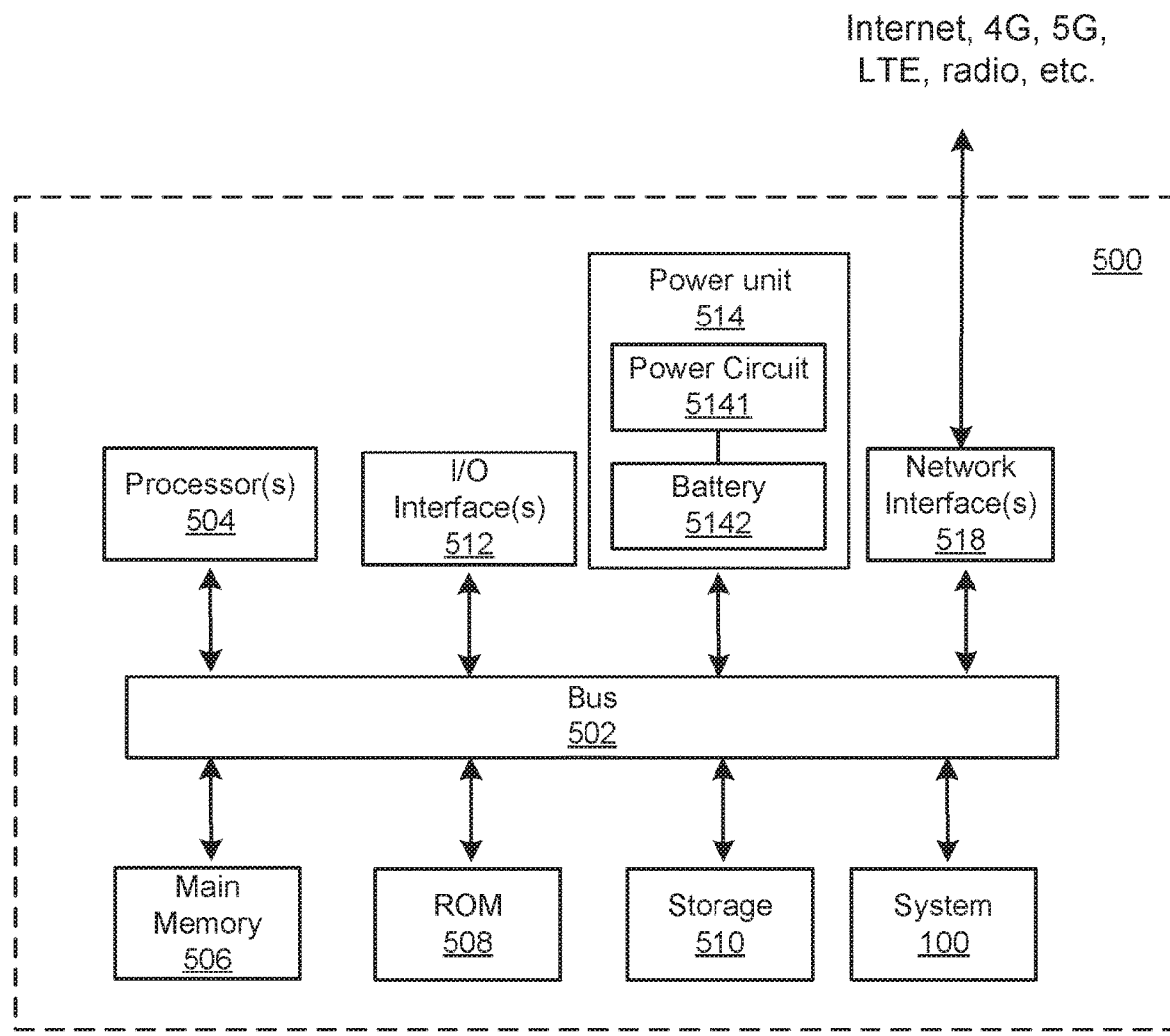
FIG. 5 is a block diagram of an example system in which any of the embodiments described herein may be implemented.

FIG. 5 is a block diagram that illustrates a system 500 upon which any of the embodiments described herein may be implemented. The system 500 may be implemented as a variety of devices, such as a mobile phone, a computer, a pad, a wearable electronic device, etc. The system 500 includes a bus 502 or other communication mechanism for communicating information and includes the system 100 described above and coupled with bus 502 for providing on-demand access to communication networks. The system 500 also includes one or more hardware processors 504 coupled with bus 502 for processing information. Hardware processor(s) 504 may be, for example, one or more general purpose microprocessors, one or more Central Processing Units (CPUs), etc. For example, the system 500 may be implemented as a mobile phone or sensor, and the processors (s) 504 may be configured to control various functions of the mobile phone or sensor.

The system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render system 500 into a special-purpose machine that is customized to perform the operations specified in the instructions. The system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The system 500 may implement the techniques described herein using customized hard-wired logic, one or more ASICs or FPGAs, firmware and/or program logic which in combination with the computer system causes or programs system 500 to be a special-purpose machine. According to one embodiment, the techniques herein are performed by system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the methods and/or process steps described herein. In alternative embodiments, hard-wired circuitry may be used in place of or in combination with software instructions.

The main memory 506, the ROM 508, and/or the storage 510 may include non-transitory computer readable storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Computer readable media may include permanent and volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EE-PROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to the computation device. Accordingly, the computer readable media may exclude transitory media, such as modulated data signals and carriers.

The system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, satellite chip, or a modem to provide a data communication connection to a corresponding type of telephone line. The communication interface 518 may implement wireless communication links (e.g., 4G, 5G, LTE, radio, etc.). In any such implementation, communication interface 518 sends and receives electrical, electromagnetic or optical signals that carry digital data streams representing various types of information.

The system 500 may further include an I/O interface 512 (e.g., keyboards, touchscreens, liquid crystal display, speaker, microphone, etc.). The I/O interface 512 can input data captured from the outside environment and/or output data from the system 500. The system 500 can send messages and receive data, including program code, through the network(s), network link, I/O interface, and communication interface 518. In the Internet example, a server might transmit a requested code for an application program through the Internet, the ISP, the local network and the communication interface 518. The received code may be executed by processor 504 as it is received, and/or stored in storage device 510, or other non-volatile storage for later execution.

The system 500 may further include a power unit 514. The power unit 514 may include a power circuit 5141 and one or more batteries 5142 (e.g., Li-ion batteries) configured to power one or more components of the system 500. The power circuit 5141 may couple to the one or more batteries 5142 and the control circuit 105 of the system 100. A person skilled in the art would appreciate that the supply of power from the batteries 5142 can be regulated by the power circuit 5141. The power circuit 5141 can be controlled by the processors 504 and/or the state machine 103 described above (via the control circuit 105). For example, the one or more processors 504 may constrain the power supply and set the system 500 to an idle mode to consume little or none power when the system 500 is not operated for more than a preset time, and may set the system 500 to an active mode to consumer power at a regular rate when the system 500 is operated again. For another example, as discussed above, the state machine 103 may awaken the system 500 from a sleeping power mode or leave the system 500 in a sleeping power mode depending on the signal received by the system 100, thereby minimizing power consumption, while ensuring the reception of incoming communications.

Though shown as separate units, various components of the system 100 may also be integrated into other components of the system 500. For example, the processor(s) 504 or portions thereof may comprise the state machine 103, the main memory 506, the ROM 508, and the storage 510 may comprise the memory 104, the communication interface 518 may comprise the antenna 101 and the voltage rectifier 102, etc.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A network on-demand access method implementable by a mobile phone associated with a base station, the method comprising:
   receiving a wakeup signal from the base station by an antenna of the mobile phone;
   deriving power from the received wakeup signal; and
   in response to a determination, made using at least the power derived from the received wakeup signal, that the received wakeup signal corresponds to the mobile phone, setting the mobile phone to an active power mode using at least the power derived from the received wakeup signal;
   wherein the determination that the received wakeup signal corresponds to the mobile phone is made by:
   obtaining an identification code from one or more frequency combinations comprised in the wakeup signal; and
   in response to a determination that the obtained identification code matches an identification code of the mobile phone, determining that the received wakeup signal corresponds to the mobile phone.

2. The method of claim 1, wherein the receiving and the deriving power are performed while the mobile phone is in a power saving mode.

3. The method of claim 1, wherein deriving the power from the received wakeup signal comprises converting the received wakeup signal to DC power.

4. The method of claim 3, wherein in response to a determination that the DC power exceeds a threshold, determining that the wakeup signal corresponds to the mobile phone.

5. The method of claim 1, wherein deriving the power from the received wakeup signal comprises:
   converting the received wakeup signal to DC power and applying the DC power to a logic circuit for determining if the received wakeup signal corresponds to the mobile phone.

6. The method of claim 1, wherein the mobile phone does not reflect back any signal based on the received wakeup signal.

7. The method of claim 1, wherein:
   receiving the wakeup signal comprises receiving the wakeup signal from one or more base stations.

8. The method of claim 1, further comprising supplying power from a power source for setting the mobile phone to an active power mode.

9. The method of claim 1, wherein the determination that the received wakeup signal corresponds to the mobile phone is made using
   the power derived from the received wakeup signal without power supply from a power source.

10. The method of claim 1, wherein the determination that the received wakeup signal corresponds to the mobile phone is made using
    at least the power derived from the received wakeup signal and a power supply of less than 10 dBm.

11. The method of claim 1, wherein the determination that the received wakeup signal corresponds to the mobile phone is made using
    at least the power derived from the received wakeup signal and a power supply of less than 1 dBm.

12. A mobile phone associated with a base station, comprising:
    an antenna configured to receive a signal from the base station;
    a rectifier circuit configured to derive power from the received signal;
    a logic circuit configured to determine if the received signal corresponds to the mobile phone using at least the power derived by the rectifier circuit from the received signal; and
    a control circuit configured to, in response to a determination that the received signal corresponds to the mobile phone, set the mobile phone to an active mode using at least the power derived from the received signal;
    wherein, to determine if the received signal corresponds to the mobile phone, the logic circuit is configured to:
    obtain an identification code from one or more frequency combinations comprised in the signal;
    compare the identification code obtained from the signal with an identification code of the mobile phone; and
    if the obtained identification code matches the identification code of the mobile phone, determine that the received signal corresponds to the mobile phone.

13. The mobile phone of claim 12, wherein, to derive power from the received signal, the rectifier circuit is configured to convert the received signal to DC power.

14. The mobile phone of claim 12, wherein the logic circuit is configured to determine if the received signal corresponds to the mobile phone while the mobile phone is in a power saving mode.

15. The mobile phone of claim 12, wherein the control circuit is further configured to, in response to a determination that the received signal does not correspond to the mobile phone, leave the mobile phone in the power saving mode.

16. The mobile phone of claim 12, wherein the logic circuit is further configured to derive power only from the rectifier circuit for determining if the received signal corresponds to the mobile phone.

17. The mobile phone of claim 12, further comprising a power source configured to supply less than 10 dBm to the logic circuit for determining if the received signal corresponds to the mobile phone.

18. The mobile phone of claim 12, wherein the control circuit is configured to derive power only from the rectifier circuit for setting the mobile phone to an active mode.

19. A network on-demand access method to be performed by a mobile phone associated with a base station, comprising:

receiving a signal from the base station while the mobile phone is in a power saving mode;
rectifying the received signal to derive DC power; and
in response to a determination, made using the derived DC power, that the received signal corresponds to the mobile phone, setting the mobile phone to an active power mode using the derived DC power;
wherein the determination that the received signal corresponds to the mobile phone is made by:
obtaining an identification code from one or more frequency combinations comprised in the received signal; and
in response to a determination that the obtained identification code matches an identification code of the mobile phone, determining that the received signal corresponds to the mobile phone.

* * * * *